United States Patent [19]

Dadourian

[11] Patent Number: 5,557,339
[45] Date of Patent: Sep. 17, 1996

[54] SCREEN FILTERING BOUNDARY DETECTION FOR NOISE FILTERING PRIOR TO IMAGE COMPOSITING

[75] Inventor: Arpag Dadourian, Northridge, Calif.

[73] Assignee: Ultimatte Corporation, Chatsworth, Calif.

[21] Appl. No.: 240,881

[22] Filed: May 9, 1994

Related U.S. Application Data

[63] Continuation-in-part of Ser. No. 48,763, Apr. 15, 1993, abandoned.

[51] Int. Cl.[6] ............................................. H04N 9/74
[52] U.S. Cl. ........................ 348/586; 348/587; 348/606; 348/631
[58] Field of Search ............................... 348/584, 585, 348/586, 587, 588, 589, 590, 591, 592, 593, 597, 598, 599, 607, 625, 627, 630, 631; H04N 9/74, 5/262, 5/272

[56] References Cited

U.S. PATENT DOCUMENTS

| | | |
|---|---|---|
| 3,595,987 | 7/1971 | Vlahos . |
| 3,778,542 | 12/1973 | Hanseman . |
| 4,007,487 | 2/1977 | Vlahos . |
| 4,100,569 | 7/1978 | Vlahos ........................................ 348/587 |
| 4,344,085 | 8/1982 | Vlahos ........................................ 348/587 |
| 4,589,013 | 5/1986 | Vlahos et al. ............................ 348/587 |
| 4,625,231 | 11/1986 | Vlahos ........................................ 348/587 |
| 5,032,901 | 7/1991 | Vlahos ........................................ 348/587 |
| 5,343,252 | 8/1994 | Dadourian ................................ 348/587 |

Primary Examiner—James J. Groody
Assistant Examiner—Michael H. Lee
Attorney, Agent, or Firm—Blakely, Sokoloff, Taylor & Zafman

[57] ABSTRACT

A method and apparatus which allows different amounts of filtering to be applied to specific parts of a foreground image, thus minimizing visible noise in the backing area, while preserving fine detail information of foreground objects. The method and apparatus identify three areas within the foreground, namely unobscured backing (screen) area, screen to foreground subject transition area, foreground subject area. The area where full amount of filtering is desired is the backing area, including shadows. This is the area where the background image will be added, and if noise is present in this area, it will be added to the background image. The transition area from the screen to the foreground object requires variable amounts of filtering, depending on the width of the transition. For sharply focused edges and very fine detail, the transition width is very small, and any filtering applied there will cause blurring and softening of these edges and details. Therefore, no filtering is applied to those areas. For out of focus and moving objects, the transition width is large, and no foreground detail information is visible. In these areas, a variable amount of filtering is applied, based on the width of the transition. In this manner, noise in these transition areas is significantly reduced, without much noticeable change in already blurred edges. Within foreground subject areas, no filtering is applied, thus preserving the detail of the foreground subject.

6 Claims, 4 Drawing Sheets

SCREEN FILTERING BOUNDARY DETECTION FOR NOISE FILTERING PRIOR TO IMAGE COMPOSITING

This is a continuation-in-part of application Ser. No. 08/048,763, filed Apr. 15, 1993, now abandoned.

BACKGROUND OF THE INVENTION

In image compositing, presence of noise, especially in the backing (screen) area, is an annoying problem. The presence of noise is more noticeable when full additive mix is applied, where a foreground image is processed by subtracting the screen components of the image, then added to a processed background image. This problem is made worse when foreground images are recorded on film. Film grain, especially in the blue layer, becomes visible noise.

When performing image compositing, eliminating or minimizing visual noise is a crucial factor for obtaining acceptable results. Most image compositing equipment use various techniques to eliminate noise, by amplifying and reshaping the matte or the key signal. Unfortunately, this results in loss of valuable fine detail from the foreground image, and gives an unnatural "cut and paste" look to the final composite. In many cases, this might be the only acceptable compromise.

Various filtering techniques (averaging, recursive) have been used to minimize visual noise. Unfortunately, simply filtering the whole picture makes the foreground subject look soft, with noticeable loss of fine detail. With recursive noise reduction techniques, moving or out of focus objects tend to lose part of the blurred edges, thus losing the natural look.

SUMMARY OF THE INVENTION

The technique described below uses a method which allows different amounts of filtering to be applied to specific parts of a foreground image, thus minimizing visible noise in the backing area, while preserving fine detail information of foreground objects. This process divides the foreground image into three parts: backing (screen) area, screen to foreground object transition area, foreground object area. The area where full amount of filtering is desired is the backing area, including shadows. This is the area where the background image will be added, and if noise is present in this area, it will be added to the background image. The transition area from screen to the foreground object requires variable amounts of filtering, depending on the width of the transition. For sharply focused edges and very fine detail, the transition width is very small, and any filtering applied there will cause blurring and softening of these edges and details. Therefore, no filtering will be applied to those areas. For out of focus and moving objects, the transition width is large, and no foreground detail information is visible. In these areas, a variable amount of filtering is applied, based on the width of the transition. This will significantly reduce noise in these transition areas, without much noticeable change in already blurred edges. Within foreground object areas, no filtering is applied, thus preserving every detail present.

DETAILED DESCRIPTION OF THE INVENTION

Figure 1A:
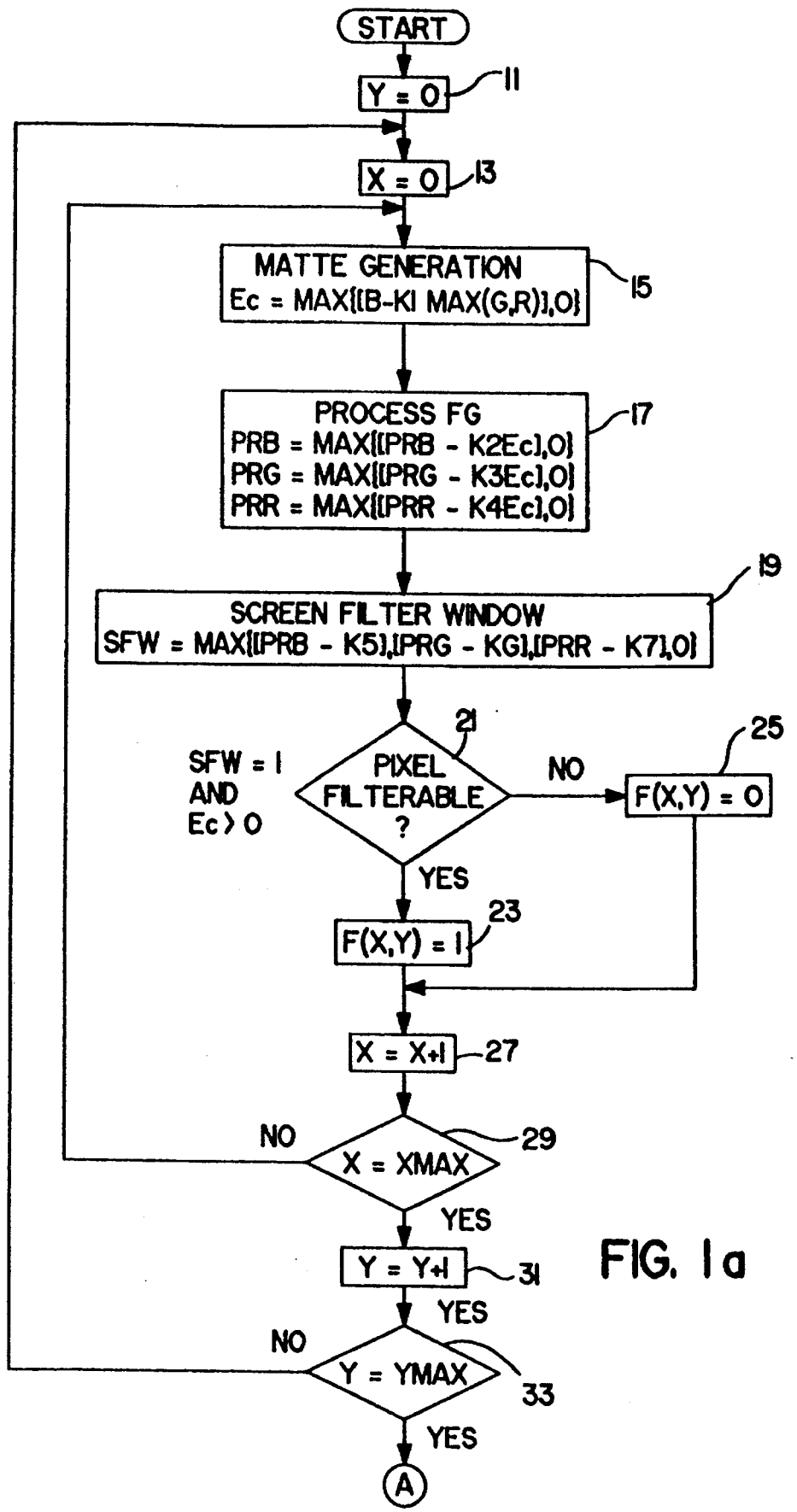
FIGS. 1 and 1b are a flow chart showing the flow of the functions which comprise the invented system.

In order to apply different filtering algorithms to a foreground image to be processed for compositing with a background scene, the foreground image video signals must be processed to define the boundaries for each of three areas of the foreground image: a) Backing (screen), b) backing to foreground object transition, and c) foreground object.

U.S. Pat. Nos. 4,100,569, 4,344,085, 4,589,013 and 4,625,231 describe a unique linear method for compositing a foreground object disposed between a colored backing and camera, and a background scene, to form a composite image. This invention utilizes two processing steps from the above mentioned patents: Generation of the matte equation, and processing equation of the foreground image.

The basic matte ($E_c$) Equation is:

$$E_c = MAX\{[B - K1*MAX(G, R)], 0\} \qquad \text{EQ.1}$$

where: K1 is Matte Density $E_c$ is a function linearly proportional to the luminance and visibility of the backing. More complex forms of the Ec equation, which include black gloss, density balance, density 1, and density 2, could also be used. Some of these more complex Ec equations are described in the above mentioned patents. Additional versions of $E_c$ equations are described in co-pending patent application Ser. No. 08/048,750 filed Apr. 15, 1993, now U.S. Pat. No. 5,343,252 issued Aug. 30, 1994.

$E_c$ is next used to remove backing color from the foreground image. This process is performed by subtracting proportional amounts of Ec from each of blue, green, and red components of the backing, thus reducing the backing color, including shadows, to black.

The equations for processed foreground video are:

$$\text{Processed } B \text{ } (PRB) = MAX\{[B - K2E_c], 0\} \qquad \text{EQ.2}$$

$$\text{Processed } G \text{ } (PRG) = MAX\{[G - K3E_c], 0\} \qquad \text{EQ.3}$$

$$\text{Processed } R \text{ } (PRR) = MAX\{[R - K4E_c], 0\} \qquad \text{EQ.4}$$

where:

K2=BMAX/$E_c$MAX

K3=GMAX/$E_c$MAX

K4=RMAX/$E_c$MAX $E_c$Max is the value of $E_c$ at BMAX, GMAX and RMAX where BMAX, GMAX, RMAX are reference screen values selected to represent full screen visibility. This selection can be done manually, or automatically.

Processed foreground video provides the boundary information between the foreground object to screen and screen areas (including all shadow areas). With this information, an adjustable filter window is set, within which filtering algorithms are applied to the screen and shadow areas. Using processed foreground equations together with the Ec equation, rather than the Ec equation by itself to define the screen area, has the advantage of being shadow density independent. The equation for noise suppressed processed video is:

$$PRV\text{-}N = MAX\{[PRB - K5], [PRG - K6], [PRR - K7], 0\} \qquad \text{EQ.5}$$

where K5, K6 and K7 are each an offset for blue, green and red respectively set to be slightly larger than residual noise present in the processed foreground video signals to assure that no noise remains in the processed foreground video signals in the backing area.

The $E_c$ signal provides the boundary information between foreground object and the object to screen transition area. EQ.5 provided the boundary between object to screen and screen areas. Together they provide transition area boundary information. Within this transition area, filtering may be applied to at least the initial portion of the transition. The equation for the noise suppressed, transition area processed video is:

$$PRV\text{-}N\text{-}O = \mathrm{MAX}\{[PRB\text{-}K5\text{-}K8], [PRG\text{-}K6\text{-}K9], [PRR\text{-}K7\text{-}K10], 0\} \qquad \text{EQ.6}$$

where K8, K9 and K10 are additional offsets such that the amount of the transition area to be considered for filtering is a function of the values set for K8, K9 and K10.

The screen, foreground object, and object to screen areas are defined as follows:

From EQ.5 and EQ.1,

Screen area is defined by all pixels whose: PRV=0 and Ec>0

Foreground object area is defined by all pixels whose: PRV≧0 and $E_c$=0

From Eq.6 and Eq.1,

Foreground object to screen transition area is defined by all pixels whose:

PRV>0 and $E_c$>0

The equation for the transition area boundary (TAB) is:

$$TAB = [PRV \text{ AND } E_c] = 0 \qquad \text{EQ.7}$$

where AND designates "the lower of".

When TAB is 0 because a PRV pixel reaches 0, that pixel has exited the transition area and is in the screen or backing area. When TAB is 0 because $E_c$ reaches 0, that pixel has exited the transition area and is in the foreground subject.

After defining screen and transition areas, various filtering algorithms can be applied to one or both of these parts of the image. An adaptive filter using averaging techniques is an example. The filter kernel size, or the array of pixels to be averaged, or the aperture size, is a function of the proximity of the pixels within the kernel to the transition boundary. The closer the pixels, the smaller the kernel. Kernel size is also a function of transition width. The smaller the width, the smaller the kernel size is, as the object has a sharply focused edge. Kernel size is also a function of image resolution. The higher the resolution, the larger the number of pixels that sample a film grain, hence the larger the size of kernel is needed.

A further simplification can be made in the above mentioned methods by using either PRV-N or PRV-N-O to define a common screen and transition area. However, defining a common screen and transition area is less versatile than distinguishing between the two areas because the transition areas have no separate filter window adjustments.

In ideal situations, screen color proportions, i.e., the ratio of B:G:R, should be constant over the whole image, resulting in perfect screen suppression in equations 2, 3, and 4. In reality, the screen color proportions are not constant. The ratio of B:G:R can change depending on lighting and camera angles. Another source of screen color mistracking is the non-linear nature of film. The result of this mistracking is imperfect suppression of the screen. Those areas which are not fully reduced to zero contribute to visible noise. Filtering these areas requires widening the filtering window, which, in turn, can result in loss of some foreground object detail.

U.S. Pat. No. 5,032,901 which issued Jul. 16, 1991 describes several ways of eliminating screen imperfections and mistrackings. Performing screen correction eliminates all these imperfections, resulting in a perfectly even screen. Performing screen filtering after screen correction results in more evenly filtered images, with no compromises to the foreground objects.

The boundary detection methods for screen filtering described above are for blue screen. With appropriate color substitutions in the above equations, these methods can be used for green and red screens as well.

The boundary detection methods for screen filtering described above can be implemented in hardware, or software, or a combination of the two.

FIG. 1 is a flow chart showing the flow of the various functions performed by the invented system. The flow shows the processing performed on each pixel in a video image to be processed according to the present invention. As shown in FIG. 1, at steps 11 and 13, variables x and y are set to zero. These variables are used as a counter to step through the pixels making up a video image. Typically, pixel position 0,0 (i.e., x=0 and y=0) is the upper left most pixel, although different display systems may utilize a different screen position as the origin. The x counter counts along the horizontal or x-axis of the display and the y counter counts along the vertical or y-axis of the display. In step 15, the $E_c$ signal is generated as described above. In the equation, the RGB values of the current pixel are used in the equation. In the next step 17, the foreground video signal is processed such that values for PRB, PRG and PRR are determined. In the next step 19, the processed video is determined as described above using the PRB, PRG and PRR values. Optionally, the transition area may also be determined at this time. In other words, for a particular pixel, PRV-N is one or zero and, if used, PRV-N-O is one or zero. In step 21, a test is made to determine if the current pixel is filterable. A pixel is deemed to be filterable if PRV-N=1 and $E_c$>0 and, if used, PRV-N-O=1. If the pixel is filterable, a filter flag (F(X,Y)) is set to one in step 23 otherwise the flag is set to zero in step 25. The x counter is incremented in step 27 and in step 29 a test is made to see if the current line has been completed by comparing the current value of x to the maximum x (XMAX). The value of XMAX is dependent upon the number of pixels in each scan line of the image being processed. Similarly, in steps 31 and 33 the y counter is incremented and a test is made to see if each scan line in the image has been processed. If the image is not yet completely processed, the above functions are repeated for the next pixel in the image being processed as a result of the test in step 33.

Figure 1B:
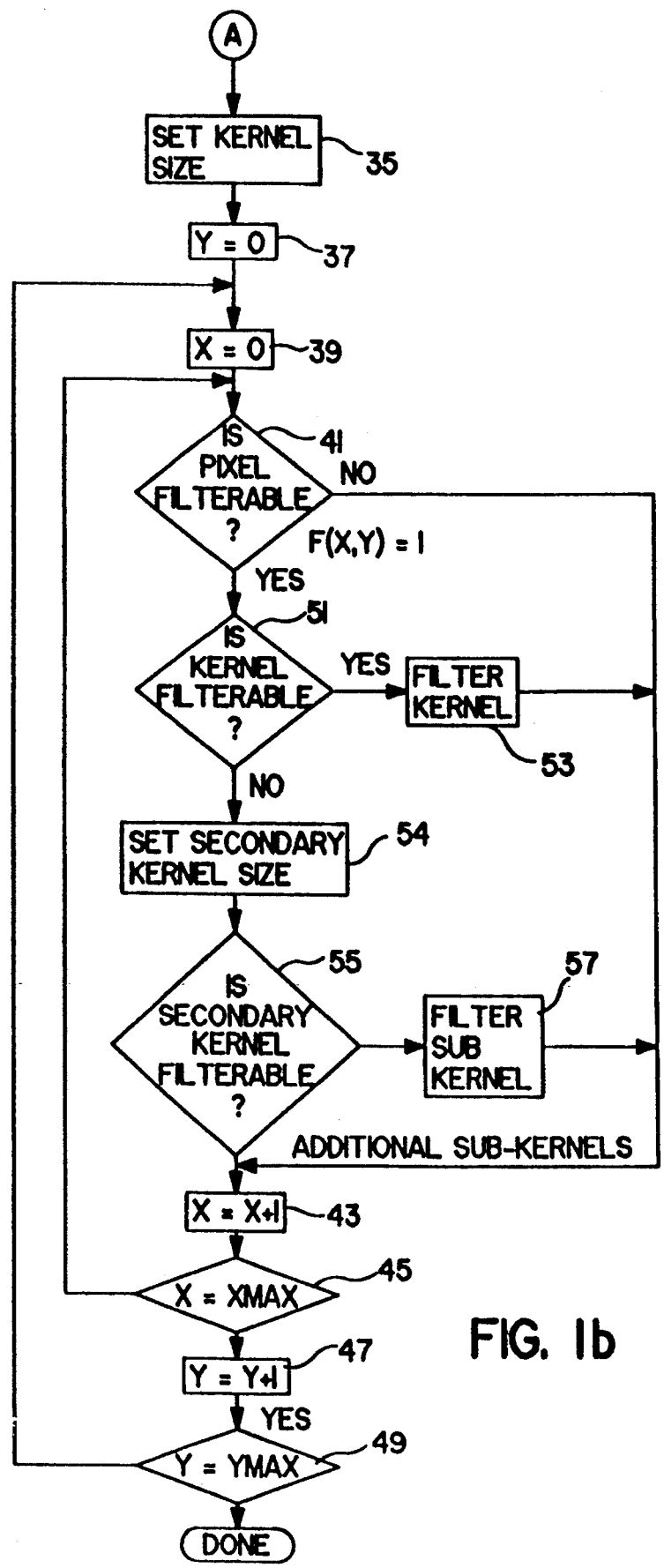

Once the pixel filterable flag has been determined for each pixel in the image being processed, processing continues with step 35 shown in FIG. 1b. At step 35, the size of the kernel being operated upon is set. This size is set by the user based upon a user input. Typically, the kernel size is set by the user to be an area of 5 by 5 pixels. However, this kernel size may be increased or decreased depending upon the characteristics of the image being processed and the results which the user desires to obtain. In steps 37 and 39, the x and y counters are set back to zero.

At step 41, a test is made to see if the pixel is filterable by checking the F(X,Y) flag. If the flag is zero, no further processing of that pixel is performed and the x counter is incremented at step 43 and the next pixel is then processed by repeating from step 41. If the test at step 45 shows that the end of the scan line has been reached, the y counter is incremented in step 47 and the test in step 49 is performed to determine whether or not the image has been completely processed. If it has been, the process ends, otherwise processing begins again for the next pixel at step 39.

If the pixel is determined to be filterable in step 41, the test at step 51 is performed to determine if the kernel is filterable. Specifically, this test checks to see if all of the pixels in the kernel of the current pixel are also filterable. If the kernel is filterable, it is filtered in step 53. The processed performed by step 53 may be any suitable filter which is desired to be used, such as an adaptive filter using averaging techniques, a multiple pass filter, gaussian, weight average or a recursive filter. The details regarding the implementation of suitable filters for filtering kernels are well known to person skilled in the field of the invention. Since such details are not necessary for a complete understanding of the invention, such details are not set forth herein.

If the test at step 51 determines that the kernel is not filterable, at step 54, a secondary kernel size is set by the user. The secondary kernel size is smaller that the kernel size set in step 35. For example, for a kernel size of 5 by 5 pixels, the secondary kernel size might be set to 3 by 3 pixels. Again, the secondary kernel size is set by a user input. At step 55 another test is performed to see if the secondary kernel is filterable. This is the same test as was performed in step 51, excepting that the test only looks at the secondary kernel pixels. If the secondary kernel is filterable, it is filtered in step 57. This filtering is the same as was discussed above with respect step 53. The secondary kernel filterable test and filter sub-kernel process are performed for each additional sub-kernel within the current kernel. Upon completion of processing all the secondary kernels, further processing continues with the next pixel in the scan line at step 43 which increments the x-counter.

Figure 2:
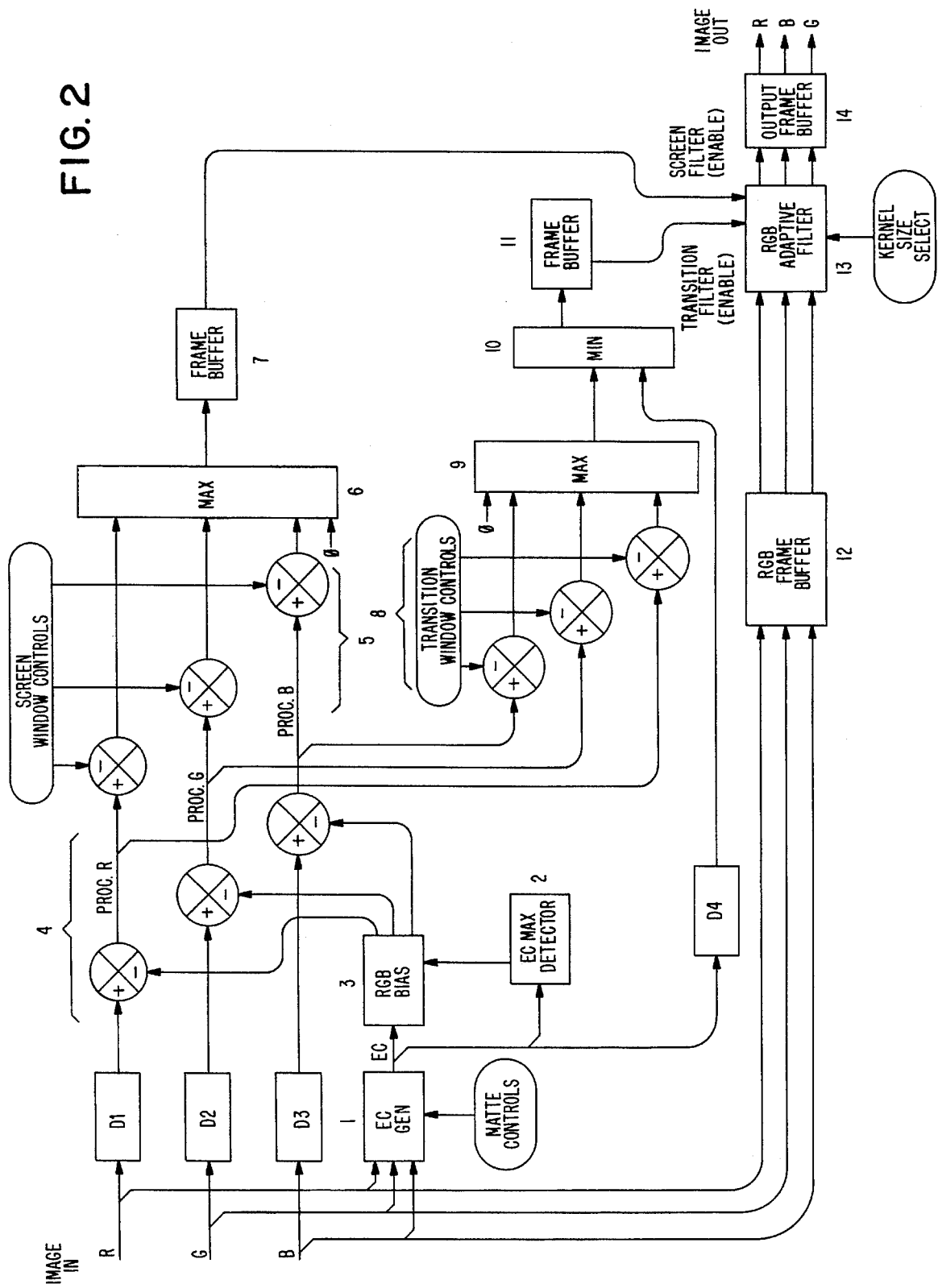
FIG. 2 is a detailed block diagram showing the elements of the invented system.
Figure 3:
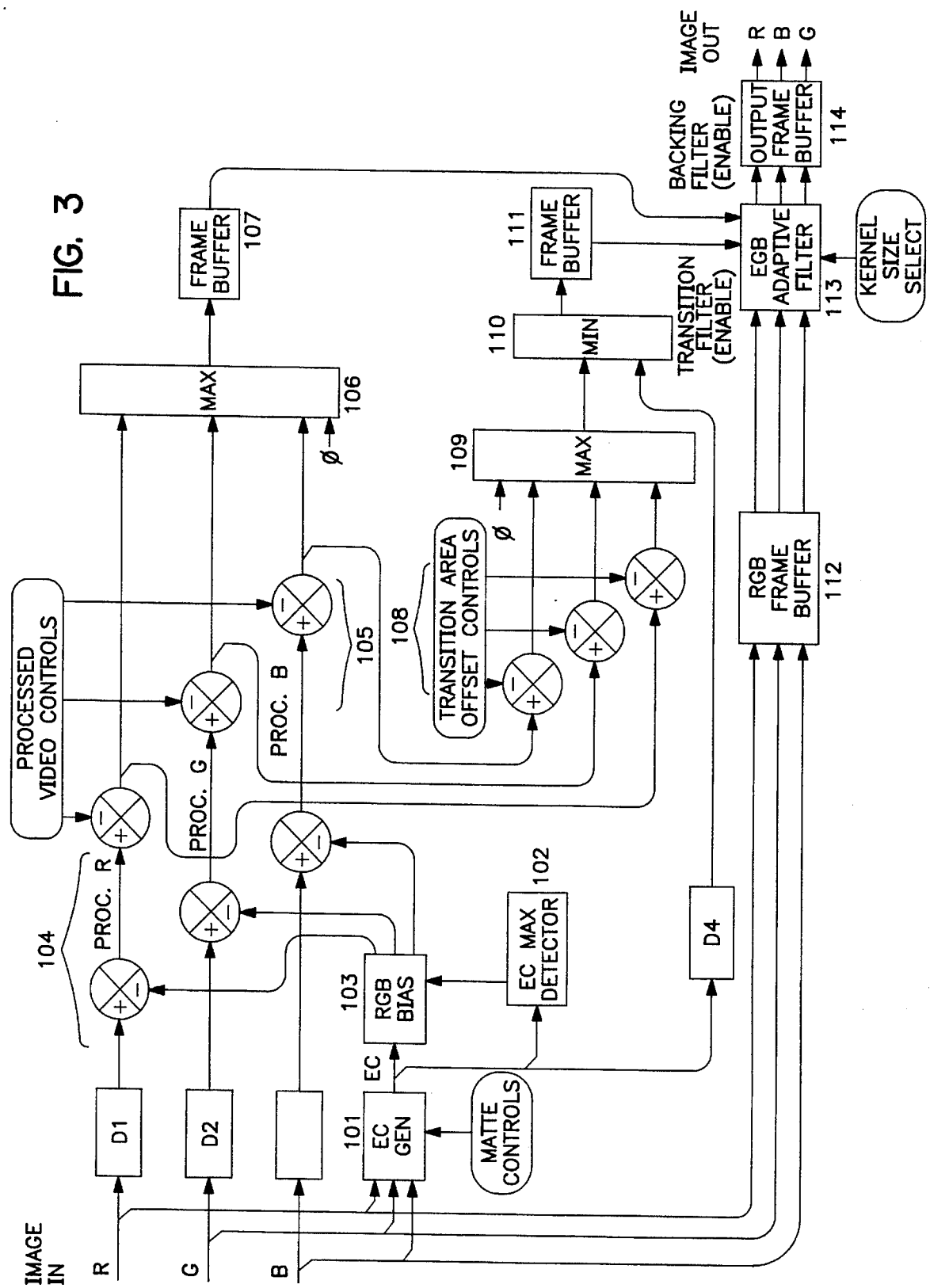
FIG. 3 is a detailed block diagram showing the elements of the invented system in an alternate embodiment.

FIGS. 2 and 3 are each a block diagram showing how the system may be implemented in hardware, specifically, a digital circuit.

The inputs are digitized R, B and G signals. The main processing is performed by the elements shown in FIGS. 2 and 3 as $E_c$GEN 101, $E_c$ MAX detector 102, RGB bias 103, process R, G and B 104, processed video offset generation 105, processed video maximum select 106, frame buffer 107, transition area offset generation 108, transition area maximum select 109, transition area identification 110, frame buffer 111, RGB frame buffer 12, RGB adaptive filter 113 and output frame buffer 114.

$E_c$GEN 101 generates the $E_c$ control signal according to the techniques described above and taught in U.S. Pat. Nos. 4,100,569, 4,344,085, 4,589,013 and 4,625,231. $E_c$ MAX detector 102 detects the maximum $E_c$ value and its position in the image. This circuit may be implemented using a peak detector and register. RGB bias 103 generates the constants K2, K3 and K4 described above. A suitable RGB bias circuit 103 is described in U.S. Pat. No. 4,625,231 which issued Nov. 25, 1986 and is assigned to Ultimatte Corporation.

Process R, G and B 104 is a circuit which implements EQ.-2, EQ.-3 and EQ.-4 described above. This element may be implemented as a set of difference circuits having delayed R, G and B as one input from which RGB bias values are subtracted. Processed video offset generation 105 is implemented as a set of three difference circuits with a set of manually set values (K5, K6 and K7) subtracted from processed R, G and B respectively as shown in FIG. 3. The outputs of the difference circuits of processed video offset generation 105 are connected to the input of maximum select circuit 106 which selects the maximum of the output of the difference circuits and 0. This result is stored in frame buffer 107 which is a commercially available component. Elements 108 and 109 used for transition area offset generation are comparable to elements 105 and 106 used for processed video offset generation. As shown in FIGS. 2 and 3, the inputs to element 108 may be from the difference circuits 104 or difference circuits 105.

Transition area identification 110 selects the minimum of Ec and the output of circuit element 109 and stores the result in frame buffer 111 which is also a commercially available component.

I claim:

1. In a system for compositing foreground scene and background scene video signals having red, blue and green components, said foreground scene video signals corresponding to a foreground scene and said background scene video signals corresponding to a background scene, each of said components having a corresponding video signal level, to obtain a composite video image wherein the foreground scene includes a foreground subject disposed between a colored backing and a camera, said colored backing having a luminance and visibility, said foreground scene video signals defining a portion of the colored backing area which is unobscured, an opaque foreground subject area and a transition area between said unobscured colored backing area and said opaque foreground subject area, wherein filtering is applied to portions of said foreground scene to reduce visual noise in the composite video image, the improvement comprising:

a) means (101) for generating a control signal having a level proportional to the luminance and visibility of the colored backing;

b) means (103) for adjusting the level of the control signal to match the video signal level of the red, blue and green color components of the video signal for the colored backing;

c) means (104) for subtracting the level matched control signal from the foreground scene video signals;

d) means (105, 106, 108, 109, 110) for processing the foreground scene video signals to identify said transition area;

e) means (113) for applying a predetermined amount of filtering to said foreground scene video signals corresponding to a predetermined portion of said transition area prior to processing of said foreground scene video signals by said processing means.

2. In a method for compositing foreground scene and background scene video signals having red, blue and green components, said foreground scene video signals corresponding to a foreground scene and said background scene video signals corresponding to a background scene, each of said components having a corresponding video signal level, to obtain a composite video image wherein the foreground scene includes a foreground subject disposed between a colored backing and a camera, said foreground scene video signals defining a portion of the colored backing area which is unobscured, an opaque foreground subject area and a transition area between said unobscured color backing area and said opaque foreground subject area, wherein filtering is applied to portions of said foreground scene to reduce visual noise in the composite video image, the improvement comprising the steps of:

a) generating a control signal having a level proportional to the luminance and visibility of the colored backing;

b) adjusting the level of the control signal to match the video signal level of the red, blue and green color components of the video signal for the colored backing;

c) subtracting the level matched control signal from the foreground scene video signals;

d) processing the foreground scene video signals to identify said transition area;

e) applying a predetermined amount of filtering to said foreground scene video signals corresponding to a predetermined portion of said transition area prior to processing of said foreground scene video signals by said processing step.

3. In a system for compositing foreground scene and background scene video signals having red, blue and green components, said foreground scene video signals corresponding to a foreground scene and said background scene video signals corresponding to a background scene, each of said components having a corresponding video signal level, to obtain a composite video image wherein the foreground scene includes a foreground subject disposed between a colored backing and a camera, said colored backing having a luminance and visibility, said foreground scene video signals defining a portion of the colored backing area which is unobscured, an opaque foreground subject area and a transition area between said unobscured colored backing area and said opaque foreground subject area, wherein filtering is applied to portions of said foreground scene to reduce visual noise in the composite video image, the improvement comprising:

a) means (101) for generating a control signal having a level proportional to the luminance and visibility of the colored backing;

b) means (103) for adjusting the level of the control signal to match the video signal level of the red, blue and green color components of the video signal for the colored backing;

c) means (104) for subtracting the level matched control signal from the foreground scene video signals;

d) means (105, 106, 108, 109, 110) for processing the foreground scene video signals to identify said unobscured colored backing area;

e) means (113) for applying a predetermined amount of filtering to said foreground scene video signals corresponding to said unobscured colored backing area prior to processing of said foreground scene video signals by said processing means.

4. In a method for compositing foreground scene and background scene video signals having red, blue and green components, said foreground scene video signals corresponding to a foreground scene and said background scene video signals corresponding to a background scene, each of said components having a corresponding video signal level, to obtain a composite video image wherein the foreground scene includes a foreground subject disposed between a colored backing and a camera, said foreground scene video signals defining a portion of the colored backing area which is unobscured, an opaque foreground subject area and a transition area between said unobscured colored backing area and said opaque foreground subject area, wherein filtering is applied to portions of said foreground scene to reduce visual noise in the composite video image, the improvement comprising the steps of:

a) generating a control signal having a level proportional to the luminance and visibility of the colored backing;

b) adjusting the level of the control signal to match the video signal level of the red, blue and green color components of the video signal for the colored backing;

c) subtracting the level matched control signal from the foreground scene video signals;

d) processing the foreground scene video signals to identify said unobscured colored backing area;

e) applying a predetermined amount of filtering to said foreground scene video signals corresponding to said unobscured colored backing area prior to processing of said foreground video signals by said processing step.

5. The system defined by claim 1 further comprising:

a) means (105, 106, 108, 109, 110) for processing the foreground scene video signals to identify said unobscured colored backing area; and b) means (113) for applying a predetermined amount of filtering to said foreground scene video signals corresponding to said unobscured colored backing area prior to processing of said foreground scene video signals by said processing means.

6. The method defined by claim 2 further comprising the steps of:

a) processing the foreground scene video signals to identify said unobscured colored backing area; and b) applying a predetermined amount of filtering to said foreground scene video signals corresponding to said unobscured colored backing area prior to processing of said foreground scene video signals by said processing step.

\* \* \* \* \*

UNITED STATES PATENT AND TRADEMARK OFFICE
CERTIFICATE OF CORRECTION

PATENT NO. : 5,557,339
DATED : September 17, 1991
INVENTOR(S) : Dadourian

It is certified that error appears in the above-identified patent and that said Letters Patent is hereby corrected as shown below:

In column 1 at line 64, please delete " 1 and 1b are a flow chart " and insert --1a and 1b are flow charts --.

Signed and Sealed this

Fourteenth Day of October, 1997

Attest:

BRUCE LEHMAN

*Attesting Officer*   Commissioner of Patents and Trademarks